United States Patent Office 3,334,102
Patented Aug. 1, 1967

3,334,102
QUINOLONOQUINOLONE PIGMENTS AND SUBSTITUTED DERIVATIVES THEREOF
Gerald R. Aldridge, Elizabeth, and Edward E. Jaffe and Howard Matrick, Union, N.J., assignors to E. I. du Pont de Nemours and Company, Wilmington, Del., a corporation of Delaware
No Drawing. Filed Feb. 27, 1964, Ser. No. 347,660
16 Claims. (Cl. 260—288)

This invention relates to new valuable yellow pigments and to a process for making them, and more particularly, to new substituted derivatives of quinolonoquinolone and to a process for their preparation.

Quinolonoquinolone is a yellow pigment that possesses properties that exhibit a high degree of lightfastness and good tinctorial strength. This compound may be represented by the following structural formula:

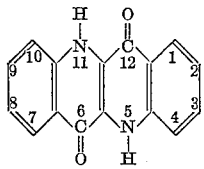

and it is also known as dibenzo(b,g)[1-5]naphthyridine-6,12(5,11H)dione. A method for preparing 2,8-dimethyl-quinolonoquinolone was first postulated by Ainley and Robinson (J. Chem. Soc 1934, 1508) which involves a series of reactions starting with the compound omega-halogen-o-amino-acetophenone and condensing it with ethoxalyl chloride to produce an intermediate compound that is reacted with p-toluidine and the resulting product is cyclized to 2,8-dimethylquinolonoquinolone. This process has several serious drawbacks. For example, following this procedure for making quinolonoquinolone, which was, up to the time of the present invention the only known method for making quinolonoquinolone, an overall yield of only about 16.5% was obtained. Secondly, the necessary starting compound of the reaction i.e., omega)-halogen-o-amino-acetophenone, is very difficult to obtain; and, before the final product can be used as a pigment, it must be purified by repeated sublimation steps. In addition, although quinolonoquinolone is a valuable yellow pigment having good tinctorial strength and excellent lightfastness, there is a need for pigments that exhibit variations in shade of color and that have a more intense color than quinolonoquinolone without sacrificing the properties of lightfastness. The present invention supplies the need for such pigmentary products and for a process for making quinolonoquinolone and derivatives thereof that eliminates the above disadvantages and is eccnomically feasible. Furthermore, except for the dimethyl derivative mentioned above, which does not possess acceptable lightfastness, no substituted derivatives of quinolonoquinolone are known and no means is known for predicting properties of these compounds if they were known.

An object of this invention is to provide a process for manufacturing quinolonoquinolone and substituted derivatives thereof. Another object of this invention is to provide a process for making quinolonoquinolones from readily available raw materials. Still another object of this invention is to provide a process for making quinolo-noquinolones resulting in increased yields over known precesses. A further object of this invention is to provide a process for making quinolonoquinolone and derivatives thereof in a substantially pure state that does not necessarily require extensive purification for use of the compounds as yellow pigments. Another object of this invention is to provide a process for making quinolono-quinolone and derivatives thereof that have good tinctorial strength and are lightfast. Still another object of this invention is to provide new yellow pigments of greenish hue having high strength and great intensity. A further object of this invention is to provide new yellow pigments of reddish hue having high strength and great intensity. Another object of this invention is to provide new yellow pigments that possess superior properties of lightfastness and fastness to solvents and chemical agents.

It has now been discovered that quinolonoquinolone and its derivatives can be prepared in high yields from readily accessible materials and in a condition that does not necessarily require extensive purification of the product for use as a pigment. In addition, certain new pigments, have been discovered that are of greenish-yellow and others of reddish-yellow hue, that show a marked increase in intensity of color and at the same time possess excellent properties of lightfastness at least equal to that of quinolonoquinolone or any known derivative thereof.

According to the process of the present invention a dialkyl dihydroxyfumarate having 1 to about 3 carbon atoms in the alkyl group is condensed with an arylamine, preferably an arylamine of the benzene series, in the presence of an acid catalyst in an inert liquid solvent to form a dialkyl diarylaminofumarate condensation product. The condensation reaction product is cyclized to a carboalkoxy-arylamino-quinolone by heating it in an inert solvent. The resulting compound is further cyclized to quinolonoquinolone or its derivative by heating it in the presence of a dehydrating acid.

Alternatively, and sometimes preferably, the process may be started, if desired, by esterifying dihydroxy-fumaric acid with an aliphatic alcohol having 1 to about 3 carbon atoms to produce the corresponding ester, i.e., dialkyl dihydroxyfumarate. When the esterification step of the process is carried out in the presence of magnesium sulfate it has been found that the magnesium sulfate displaces the equilibrium of the reaction toward completion of esterification, and surprisingly, under these conditions the yield of ester is increased from about 50% to 90% or even better.

Another method for producing quinolonoquinolones, particularly the unsymmetrical substituted compounds, can be accomplished by what may be termed the "oxal-acetate" route. According to this process an ester of oxal-acetic acid, i.e., dialkyl oxalacetate is condensed with an arylamine, preferably, but not necessarily, of the benzene series. The condensation reaction can be carried out in the presence of excess arylamine or an inert liquid solvent. The resulting condensation product i.e., dialkyl 2-arylaminofumarate is then cyclized under the influence of heat, in a high boiling liquid inert solvent, for example, a mixture comprising about 26.5% biphenyl and 73.5% diphenyl oxide (a commercial mixture sold as "Dowtherm A"), or any other inert liquid solvent that boils above about 240° C. The solvent can be the same as that used during condensation. The cyclized product (2-carbalkoxy-4-quinolone) is chlorinated with sulfuryl chloride. The chlorinated product is then condensed with an arylamine, preferably an arylamine of the benzene series, in the presence of a large excess of the amine. The arylamine replaces the chlorine atom on the quinolone residue and a second molecule of the arylamine condenses with the ester to form a N-phenylcarboxamide group. This product is cyclized with a dehydrating acid, preferably poly-phosphoric acid. The temperature of the cyclization reaction is within a range of from about 90° C.–160° C.

It has now been found that halogen-substituted quino-lonoquinolones and particularly those with the halogen substituents in the meta- and/or para-positions to the nitrogen atoms and the dimethoxy-substituted quinolono-quinolone, e.g., 2,8-dimethoxy quinolonoquinolone are new and valuable yellow pigments possessing unexpected and superior pigmentary properties. For example, these new compounds may be represented by the following structural formulas:

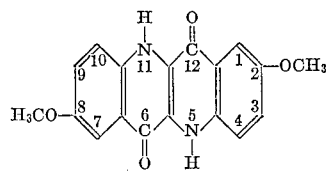

and

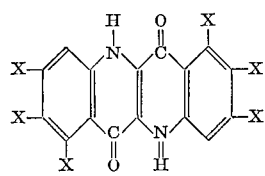

wherein X represents a substituent selected from the group consisting of F, Cl, Br and H, with the proviso that at least one and not more than two halogen atoms must be substituted on each of the terminal rings and the remaining substitution being hydrogen. These products exhibit outstanding properties especially in regard to lightfastness which is at least equal to that of quinolonoquinolone or any known derivative thereof and they are all substantially nonbleeding in solvents. The halogen-substituted quinolonoquinolones are intense yellow pigments which have a distinct greenish hue and the dimethoxy-substituted quinolonoquinolone is an intense yellow pigment possessing a distinct reddish hue.

The preferred choice of halogenated quinolonoquinolones which may be made by this invention includes those having from 1 to 4 halogen atoms in the molecule and which are located in the terminal rings in the meta- or para-positions with respect to the carbon atom to which the nitrogen is attached. The halogen may be fluorine, chlorine or bromine. The choice of halogen and the position of substitution are functions of the halogenated arylamines used in the process.

Examination of the halogen substituted quinolonoquinolones of this invention by X-ray diffraction shows that many of them exist in at least two polymorphic forms which often differ markedly in their tinctorial properties and in their stability. In general, the products obtained by precipitation from solutions in sulfuric acid or polyphosphoric acid exist in the less stable phase which is called the alpha phase. Extended treatments with solvent, especially with dimethylformamide and the like, convert the alpha phase in most cases to the much more stable beta phase as do various methods of particle size reduction by milling. These phase transformations are also frequently accompanied by color changes, the beta phase generally being greener and more intense. The existence of these polymorphic modifications and the possibility of transformations between them must be taken into account in selecting the most desirable methods of final purification and particle size reduction.

A preferred embodiment of the invention will now be described for a clearer understanding of the process. Dihydroxyfumaric acid is added to methanol followed by the addition of magnesium sulfate. The mixture is stirred and the acid is esterified under the influence of anhydrous HCl to dimethyl dihydroxyfumarate. It has been found that when the reaction is carried out in the presence of magnesium sulfate the yield of esterified product is increased from about 50% to about 90%. Dimethyl dihydroxyfumarate is then condensed with aniline in the presence of an acid catalyst, e.g. aniline hydrochloride, in an inert liquid solvent, e.g. biphenyl and diphenyl oxide or an alcohol to produce dimethyldianilinofumarate and this compound is then heated in a suitable inert solvent to about 255° C. to produce carbomethoxy-anilino-quinolone. The carbomethoxy-anilino-quinolone is heated in polyphosphoric acid to about 90° C. to 150° C. to further cyclize the compound to quinolonoquinolone. This cyclization step may be performed in the presence of an inert solvent, if desired.

For a clearer understanding of the invention the following examples are given to illustrate in detail the manner of carrying out the process of this invention for producing symmetrical substituted products but are not intended to limit the scope of the invention.

EXAMPLE 1

*Preparation of dimethyl-dihydroxyfumarate*

222 parts (1.5 mols) dihydroxyfumaric acid is added to 960 parts of methanol in a suitable agitated flask fitted with a drying tube and a means for external cooling. 300 parts of anhydrous magnesium sulfate is added to the mixture which is cooled to 0–5° C. and a stream of anhydrous gaseous HCl is bubbled through the well stirred mixture for 4.5 hours with the temperature maintained at 0–5° C. The mixture is then allowed to stand several hours without agitation but with protection from atmospheric moisture. It is then filtered, washed with a little methanol, reslurried in cold water, filtered again and washed free of acid and soluble salts and finally dried to give 243 parts (92.2% yield) of a colorless crystalline material which is very slightly soluble in water. The methanol may be replaced by other alcohols such as ethanol, propanol and the like to give equivalent yields of the corresponding esters.

The dihydroxyfumaric acid may be used in a hydrated form by adding an appropriate additional amount of the $MgSO_4$ to absorb the water.

*Condensation with aniline*

66 parts (0.375 mol) of dimethyl dihydroxyfumarate is added to 320 parts of methanol in a suitable agitated vessel fitted with a reflux condenser and a means for external heating. 77 parts (0.75 mol+10% excess) of aniline is added to the mixture together with 7.5 parts aniline hydrochloride and the charge heated to the boil and maintained under reflux for about 5.5 hours. After cooling to about room temperature, the charge is filtered, washed with a little methanol and then with water until free of acid and finally dried to give 102 parts (83.4% of theory) of dimethyl 2,3-dianilinofumarate. After recrystallization from n-butanol the melting point is 195–196° C. The analysis is:

Calculated for $C_{18}H_{18}N_2O_4$: Percent C, 66.26; percent H, 5.52; percent N, 8.58. Found: Percent C, 66.68; percent H, 5.46; percent N, 8.97.

Substituted anilines may be used in place of aniline in this process to give appropriately substituted condensation products. Thus p-toluidine gives dimethyl 2,3-bis(p-toluidino)-fumarate. Likewise the halogen, especially chlorine or bromine, alkyl and alkoxy derivatives of aniline may be used to prepare the corresponding condensation products.

*First cyclization*

50 parts of the dimethyl dianilinofumarate from above is added to a suitable agitated vessel containing 500 parts of an inert high boiling liquid solvent comprising a mixture of about 26.5% biphenyl and 73.5% diphenyl oxide i.e., "Dowtherm A." The charge is heated rapidly, while well stirred, to 250° C., held for about 5 minutes, at that temperature and cooled to 10° C. It is filtered, washed free of "Dowtherm A" with ligroin and finally dried in a vacuum oven to give 35 parts (77.6% yield) of yellow crystals. Upon recrystallizing from methanol, the yellow crystals of 2-carbomethoxy-3-anilino-4-quinolone have a melting point of 193–194° C. The analysis is:

Calculated for $C_{17}H_{14}N_2O_3$: percent C, 69.40; percent H, 4.76. Found: percent C, 69.18; percent H, 4.82.

Alternate method of cyclization 100 parts of dimethyl dianilinofumarate is dissolved in 1000 parts "Dowtherm A" at 130° C. While keeping the temperature at 125–130° C., the solution is added slowly (½ hour period) to 400 parts "Dowtherm A" kept at 250–256° C. The charge is then cooled, filtered, washed and dried as described above to give 79 parts (87.6% yield) of a product identical to that produced above in the first cyclization step.

The product produced by the first cyclization step or the alternate method of cyclization, i.e., 2-carbomethoxy-3-anilino-4-quinolone, may be isolated in either of two forms, a yellow form when the solution is cooled rapidly and a brown form when the solution is cooled slowly. They have essentially the same melting point and show the same chemical reactions but have distinctive X-ray patterns and somewhat different infra-red spectra. They appear to be polymorphic forms.

Final cyclization 79 parts 2-carbomethoxy-3-anilino-4-quinolone prepared as described above, is added to 790 parts polyphosphoric acid (83% $P_2O_5$) and stirred. The well-stirred mixture is heated over a 1 hour period to 150° C., then held at 145–150° C. for 2 hours. After cooling to 40–50° C., water is slowly added, maintaining the temperature at about 50° C. until the vigorous reaction has ceased after which an excess of water is added; the mixture is well stirred and then filtered. It is washed free of water and dried to give 70 parts (quantitative yield) of a yellow powder. This product may be purified by dissolving in about 20 parts of 100% $H_2SO_4$ at 10° C. or below, then cautiously diluting with cold water to bring the concentration of $H_2SO_4$ down to 89% at a temperature not exceeding about 30° C. After filtering off the resulting crystalline sulfate of the pigment and washing with 85% $H_2SO_4$, it is slurried in ice and water to hydrolyze the sulfate, filtered, washed free of acid and dried to give a yellow crystalline powder analyzing as follows:

Calculated $C_{16}H_{10}N_2O_2$: percent C, 73.35; percent H, 3.82. Found: percent C, 73.65; percent H, 3.89.

The powder, quinolonoquinolone, is a high strength, intense yellow pigment of excellent durability.

Modification of final cyclization 27 parts of 2-carbomethoxy-3-anilino-4-quinolone is added to 240 parts of polyphosphoric acid and the mixture heated over a 1 hour period with good agitation to 150° C. and held at 145–150° C. for 2 hours. It is then cooled to 40° C. and 600 parts of methanol is added slowly over about 50 minutes, with the temperature maintained at 40–50° C. The mixture is then heated to the boil and boiled under reflux for 80 minutes. It is filtered, washed with water until acid free. After drying, the product is a high strength, intense yellow pigment of excellent durability.

EXAMPLE 2

Integration of condensation and cyclization steps 17.6 parts (0.1 mol) dimethyl dihydroxyfumarate is added to 152 parts "Dowtherm A" in a suitable container arranged for agitation and vacuum distillation. 65.1 parts (0.7 mol) of aniline is added to the mixture followed by 1 part of aniline hydrochloride. Vacuum is applied and maintained at about 35 mm. Hg while the charge is heated to 70–75° C. and held at that temperature for 6 hours. After cooling to room temperature, the acid is neutralized by adding 0.8 part $Na_2CO_3$ in 5 parts water. The vacuum is again applied to about 3–5 mm. Hg and the excess aniline removed by distillation along with considerable "Dowtherm A" which is periodically replaced with fresh material. When the total distillate is about 400 parts, the vacuum is released and the volume of the charge is adjusted to that of about 300 parts of "Dowtherm A," and the mixture is heated to 125° C. to bring about complete solution of the anilino ester. It is filtered hot to remove inorganic salt and then added over a 20 minute period to 80 parts of boiling "Dowtherm A." The charge is stirred at 255° C. for about 5 minutes, cooled to room temperature and filtered. The high boiling solvent is washed out with ligroin and the solid dried to give 17 parts of 2-carbomethoxy-3-anilino-4-quinolone which may be cyclized with polyphosphoric acid to quinolonoquinolone by the process described in Example 1.

EXAMPLE 3

Integration of cyclization steps 100 parts of dimethyl dianilinofumarate is dissolved in 1000 parts of "Dowtherm A" at 130° C. This solution at 125–130° C. is added over a ½ hour period to 400 parts "Dowtherm A" kept at 250–256° C. It is stirred for 5 minutes and cooled with stirring to about 100° C. 800 parts of polyphosphoric acid (82–84% $P_2O_5$) is then added with good agitation, the charge is heated to 150° C. and held at 150° C. for 2 hours. The charge separates into two liquid layers, the top layer being substantially colorless "Dowtherm A" and the major portion thereof is removed by decantation after cooling to about 60° C. 1600 parts methanol is then added with good agitation over a 15 minute period and the charge boiled under reflux for about 1.5 hours. It is then filtered, washed free of "Dowtherm A" with methanol and then with water until acid free and dried to give 66 parts (81.5% overall yield) of high strength, intense, yellow pigment.

EXAMPLE 4

Step 1

88 parts (0.5 mol) of dimethyl dihydroxyfumarate is dissolved in 316 parts of methanol in a vessel arranged for agitation and for heating under reflux. 141 parts (1.1 mol) of p-chloroaniline is then added together with 5 parts concentrated HCl and the mixture is brought to the boil and heated under reflux for about 6 hours, a precipitate forming as the heating progresses. After cooling to about room temperature, the precipitate is filtered, washed with methanol and dried at 60° C. to give 168.3 parts (85% yield of pale yellow crystals, M.P. 194.5–195.5) of dimethyl bis(p-chloroanilino) fumarate.

Step 2

173 parts of dimethyl bis(p-chloroanilino) fumarate is dissolved in 2000 parts "Dowtherm A" (23.5% biphenyl-76.5% diphenyl oxide) at 125° C. and this solution is added over a 45 minute period to 1200 parts "Dowtherm A" at 250–255° C. with stirring, maintaining a temperature of 250–255° C. during the addition and for 10 minutes thereafter. When the charge is then cooled to room temperature, an orange colored solid precipitates which is filtered, washed with "Dowtherm A" and then with petroleum ether and dried at 60° C. to give 141 parts (89% yield) of 2-carbomethoxy-3-(p-chloroanilino)-6-chloro-4-quinolone, M.P. 244–247° C.

Step 3

141 parts of 2-carbomethoxy-3-(p-chloroanilino)-6-chloro-4-quinolone is added to 1410 parts polyphosphoric acid (84% $P_2O_5$) and the mixture is heated at 145–150° C. for three hours, cooled to about 50° C. and diluted slowly with 750 parts water. The charge is then heated to the boil and boiled for 1 hour, filtered, washed acid free and dried to give 125 parts (97% yield) of 2,8-dichloroquinolonoquinolone. After extraction with boiling dimethylformamide and recrystallization from sulfuric acid the following analysis is obtained:

Calculated for $C_{16}H_8N_2O_2Cl_2$: percent C, 58.03; percent H, 2.43; percent Cl, 21.4. Found: percent C, 58.52; percent H, 2.64; percent Cl, 21.2.

After a suitable reduction in particle size, the pigment may be dispersed in an appropriate vehicle to yield a strong bright yellow coating composition of good lightfastness, free from bleeding and showing excellent resistance to chemical reagents. This product is greener and more intense than the unsubstituted quinolonoquinolone.

The use of 123 parts (1.1 mol) of p-fluoroaniline in place of the p-chloroaniline in this example, other steps being the same, results in the formation of a yellow powder which, after extraction with dimethylformamide and recrystallization from concentrated sulfuric acid, has a fluorine content of 12.48%.

Calculated for $C_{16}H_9N_2O_2F_2$—F=12.74%.

After a suitable particle size reduction, it is a bright yellow powder which may be dispersed in a suitable vehicle to give an intense yellow coating composition of high strength and good lightfastness. It is greener in hue and more intense than a similar composition made from unsubstituted quinolonoquinolone.

EXAMPLE 5

Step 1

88 parts (0.5 mol) of dimethyl dihydroxyfumarate and 178 parts of 3,4-dichloroaniline are added to 400 parts of methanol followed by 5 parts of concentrated HCl. The mixture is heated under reflux for about 6 hours and then cooled. The precipitated solid is filtered, washed with methanol and dried at 60° C. to give 193 parts (89% yield) of dimethyl bis(3,4-dichloroanilino) fumarate which is a nearly colorless product.

Step 2

92.8 parts of dimethyl bis(3,4-dichloroanilino)fumarate is dissolved in 400 parts of "Dowtherm A" at 100° C. and this solution is added over a 30 minute period to 750 parts of "Dowtherm A" maintained at 250–255° C. during the addition and for 15 minutes thereafter. After cooling to room temperature, the yellow solid is filtered, washed with "Dowtherm A" and then with ligroin and finally dried at 60° C. to give 78 parts (90% yield) of 2 - carbomethoxy - 3(3,4-dichloroanilino)-6,7-dichloro-4-quinolone.

Step 3

78 parts of this yellow solid is added to 780 parts of polyphosphoric acid (85% $P_2O_5$) and the mixture heated at 150° C. for 3½ hours. It is then cooled to 40° C. and 750 parts of water is added cautiously after which the slurry is heated at 100° C. for 1 hour, filtered, washed acid free and dried at 80° C. to give a nearly quantitative yield of a tetrachloroquinolonoquinolone which is predominantly 2,3,8,9-tetrachloroquinolonoquinolone. The analysis is:

Calculated for $C_{16}H_6N_2O_2Cl_4$: percent Cl, 35.45. Found: percent Cl, 35.12.

This product is a green-shade yellow of good intensity and excellent lightfastness.

EXAMPLE 6

Step 1

141 parts m-chloroaniline and 88 parts dimethyl dihydroxyfumarate are added to 640 parts of methanol together with 5 parts of concentrated HCl and the mixture heated under reflux for 6 hours. After cooling, the solid is filtered, washed with methanol and dried to give 171 parts (99% yield) of dimethyl bis(m-chloroanilino) fumarate, M.P. 138–140.5° C.

Step 2

72.6 parts of this product is dissolved in 450 parts "Dowtherm A" at 125–130° C. and the yellow solution is added over a 30 minute period to 500 parts of boiling "Dowtherm A" i.e., 258° C., with continued boiling for 10 minutes after the addition is complete. After cooling, the solid is filtered, washed with "Dowtherm A" then with ligroin and finally dried to give 65 parts (97% yield) of 2 - carbomethoxy - 3 - (m-chloroanilino)-7-chloro-4-quinolone.

Step 3

This product (65 parts) is added to 650 parts of polyphosphoric acid (84% $P_2O_5$) and the mixture heated at 150° C. for 3 hours. After cooling to about 50° C., 1000 parts of water is added cautiously and the mixture heated at 94–100° C. for about 15 minutes, filtered and washed free of acid. The pigment is purified by dissolving in 10 times its weight of 96% sulfuric acid and cautiously diluting with water to 90% $H_2SO_4$. The precipitated sulfate is filtered, washed with 85% $H_2SO_4$ and then added to a large volume of cold water which is then heated to the boil. After filtering, washing acid free and drying one obtains a good yield of 3,9-dichloroquinolonoquinolone which is an unusually strong, very intense greenish-yellow pigment.

In Examples 5 and 6, the use of unsymmetrically substituted anilines with both positions next to the amino group free makes possible more than one configuration during the cyclization reactions. Although the product named in each case is the predominant product of the reaction, it is impossible to exclude the presence of certain isomeric products. Thus Example 6 may well have a small amount of the 1,7-dichloro derivative as an impurity in the final product and there is a possibility of the presence of the 3,7-dichloro derivative in a minor amount.

EXAMPLE 7

Step 1

185 parts of p-bromoaniline and 88 parts of dimethyl dihydroxyfumarate are added to 600 parts methanol together with 5 parts of concentrated HCl and the mixture is heated under reflux for 3½ hours. After cooling, the yellow precipitate is filtered, washed with methanol and dried to give 193 parts (79.4% yield) of dimethyl bis(p-bromoanilino)fumarate, M.P. 201–203° C.

Step 2

145 parts of dimethyl bis(p-bromoanilino)fumarate is dissolved in 1500 parts "Dowtherm A" at 120–130° C. and this solution is added over a 40 minute period to 2000 parts of "Dowtherm A" maintained at 250–255° C. during the addition and for 15 minutes thereafter. It was then allowed to cool to room temperature, and the solid filtered, washed with a little "Dowtherm A" then with ligroin and dried to give 124 parts (91.6% yield) of 3(p-bromoanilino)-6-bromo-4-quinolone, M.P. 259–262° C.

113 parts of 3-(p-bromoanilino)-6-bromo-4-quinolone is added to 1100 parts polyphosphoric acid (84% $P_2O_5$) and the mixture is heated at 150° C. for 3½ hours. After cooling to about 50° C., 1100 parts of water is added cautiously after which the charge is reheated to 80–90° C. and held at that temperature for ½ hour. It is finally filtered, washed and dried. The solid is then slurried in 1400 parts dimethylformamide, heated under reflux for 15 minutes, filtered hot, washed with ethanol and dried to give 88 parts (84% yield) of 2,8-dibromoquinolonoquinolone which does not melt at 400° C. Upon particle size reduction, it is an intense greenish-yellow pigment.

EXAMPLE 8

Step 1

88 parts (0.5 mol.) of dimethyl dihydroxyfumarate together with 1200 parts of methanol are placed in a suitable reactor equipped for stirring, for external heating and for reflux of boiling liquid. 142 parts (1.15 mol.) of p-anisidine is then added together with 5 parts concentrated HCl; the mixture is brought to the boil and heated under reflux for 7 hours. The charge is allowed to cool and crystallize whereupon the product is isolated by filtering, washing with methanol and drying to give 87 parts (45% yield) of dimethyl-bis(p-anisidino)fumaric—M.P. 133–137° C.

Step 2

77 parts (0.2 mol.) of dimethyl-bis(p-anisidino)fumarate is dissolved in 250 parts "Dowtherm A" (eutectic of 26.5% parts biphenyl and 73.5% diphenyl oxide) at 100° C. and the solution is then added over a 30 minute period to 500 parts of "Dowtherm A" at 250–255° C. Heating is continued for about 10 minutes until no more alcohol is evolved, the charge cooled and the resulting crystalline product is isolated by filtering, washing with "Dowtherm A" and then with petroleum ether and finally drying to give 49.2 parts (70% yield) of 2-carbomethoxy-3-(p-anisidino)-6-methoxy-4-quinolone; M.P. 222–226° C.

Step 3

The product of Step 2 (49.2 parts) is hydrolyzed by heating to the boil for 2 hours with a solution of 135 parts sodium hydroxide in 1000 parts of water. The solution of the sodium salt is cooled and acidified to pH 3.0 with hydrochloric acid to precipitate the free 2-carboxy-3-(p-anisidino) - 6 - methoxy - 4 - quinolone which is filtered, washed acid free, and dried to give 45 parts (95% yield); M.P. 205° C. with decomposition.

Step 4

45 parts of 2-carboxy-3-(p-anisidino)-6-methoxy-4-quinolone is added to 450 parts polyphosphoric acid (82–84% $P_2O_5$) and the mixture is heated at 100–105° C. for 6 hours, cooled slightly and then diluted cautiously with 1000 parts of water. After heating 1 hour at 95–100° C., the product is filtered, washed acid free, and dried to give 40.7 parts of crude 2,8-dimethoxyquinolonoquinolone. The crude product is purified by extracting with a large volume of dimethylformamide at the boil, filtering, washing with water and drying to give 34 parts (80% yield) of a reddish-yellow 2,8-dimethoxyquinolonoquinolone. The analysis is:
Calculated for $C_{18}H_{14}N_2O_4$: percent C, 67.07; percent H, 4.38. Found: percent C, 66.46; percent H, 4.19.

After a suitable reduction in particle size (which may conveniently be done by ball milling with about 10 parts of sodium chloride per part of pigment and extracting the salt with hot dilute mineral acid) the pigment may be dispersed in an appropriate vehicle to yield a strong, intense yellow coating composition in the very reddish-yellow range of hue, an unusual and unexpected shade of yellow in this class of compounds. The coating composition has unusually good lightfastness, being noticeably better than unsubstituted quinolonoquinolone and very much better than 2,8-dimethylquinolonoquinolone. It is free from bleeding and shows excellent resistance to chemical reagents. It is much redder and more intense than the unsubstituted quinolonoquinolones, and also much redder than the haloquinolonoquinolones.

The following examples illustrative in detail the oxalacetate route for producing unsymmetrical substituted quinolonoquinolone derivatives.

EXAMPLE 9

Step 1

210 parts (1 mol.) of diethyl oxalacetate-sodium salt (a commercial product) is acidified in solution in benzene by wetting with 500 parts of water at 7–10° C., adding 1000 parts of benzene and then acidifying under good agitation by slowly adding dilute hydrochloric acid until the pH of the aqueous phase is below 7.0 (requires 38–40 parts 100% HCl). The benzene phase is separated and washed free of acid by extraction with water. 113 parts (1.2 mols.) of p-fluoroaniline is added and the charge heated to the boil and kept under reflux for about 4 hours, removing the water as formed by a suitable separation device. When no more water is being formed, the charge is cooled to room temperature and the unreacted fluoroaniline is removed by two extractions with 150 part portions of dilute hydrochloric acid (6 N). The benzene solution is further washed acid free and the solvent removed by distillation to leave an oil.

Step 2

The oil from Step 1 is taken up in 180 parts of "Dowtherm A" (the eutectic mixture comprising 26.5% biphenyl and 73.5% diphenyl ether). This solution is added slowly (30–40 min.) to 1600 parts of "Dowtherm A" maintained at 248–253° C. After continued heating at 250° C. for an additional 10–15 minutes, the charge is cooled to room temperature and the solid isolated by filtering, washing with "Dowtherm A," washing further with petroleum ether and drying to give 130 parts (55% yield) of a solid melting at 221–223° C. After recrystallization from alcohol the M.P. is 239–240° C. Analysis for N gave 5.9%, 6.1%. Calculated for $C_{12}H_{10}NO_3F$—6.0%. The product is 2-carboethoxy-6-fluoro-4-quinolone.

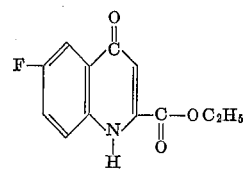

Step 3

117.5 parts (0.5 mol) of the crude 2-carbethoxy-6-fluoro-4-quinolone is dissolved with heat in a solution of 60 parts acetic anhydride in 290 parts glacial acetic acid. The solution is then cooled to 45° C. and 1.25 parts of iodine added followed by 74.5 parts of sulfuryl chloride ($SO_2Cl_2$) added dropwise while maintaining the temperature at 45° C. The mixture is then heated to the boil and boiled under reflux for 1 hour, cooled slightly and diluted with 750 parts of water. After stirring for an hour, the solid is filtered, washed and dried to give 116 parts (86% yield) of 2-carboethoxy-3-chloro-6-fluoro - 4 - quinolone. $C_{12}H_9NO_3FCl$: Calculated, Cl—13.12%. Found, Cl—13.36%.

Step 4

136.5 parts (0.5 mol) of crude 2-carbethoxy-3-chloro-6-fluoro-4-quinolone is charged to a flask containing 1100 parts of freshly distilled aniline along with 103 parts potassium acetate and 4 parts of cupric acetate. The reaction mixture is heated at 145–150° C. with stirring for 5 hours, cooled to 100° C. and poured into 2060 parts 6 N HCl solution containing ice. The precipitated solid is filtered, washed with dilute acid and then with water and dried to give 109 parts (58% yield) of 2-(N-phenyl-carboxamido-3-anilino-6-fluoro-4-quinolone.

Step 5

16.8 parts (0.045 mol) of crude 2-(N-phenyl)carboxamido-3-anilino-6-fluoro-4-quinolone is added to 270 parts of polyphosphoric acid (82–84% $P_2O_5$), and the mixture is heated to 145–150° C. and held at that temperature for about 3 hours. The viscous liquid is cooled below 100° C. and poured into a large column of ice and water. The separated solid (crude 2-fluoro-quinolonoquinolone) is filtered, washed acid free and dried. It is then slurried in about 200 parts of dimethylformamide, heated at the boil for a short time, filtered, washed with cold dimethylformamide and then with water and finally dried. The powder is then dissolved in about 100 parts of 98% sulfuric acid at 5–10° C. and cautiously diluted with water to give about 91% sulfuric acid, precipitating the quinolonoquinolone sulfate, which is filtered, washed with 85% sulfuric acid at 5–10° C. and finally added to a large volume of ice and water to regenerate a bright yellow slurry of 2-fluoro-quinolonoquinolone. After the filtering, washing and drying, there is obtained 9 parts (72% yield) of a very bright yellow powder, which does not melt at 360° and decomposes at 400–450° C. Calculated for $C_{16}H_9N_2O_2F$: percent N—10.60. Found: percent N—10.54.

For its most efficient use as a pigment, it is desirable that the particle size be reduced to give particles with surface areas in the order of 60 square meters per gram. This may be done in any of the well known procedures, such as milling in a suitable ball mill with an inert water soluble diluent (such as common salt) and extracting the salt with water. Such a small particle size pigment, when dispersed in a suitable vehicle, such as a melamine-fortified alkyd resin, yields a very bright yellow coating composition of excellent strength which is non-bleeding in the usual solvents, generally resistant to chemicals, such as acids and alkalies and exhibits good lightfastness. It is quite greenish-yellow in hue when compared to the unsubstituted quinolonoquinolone and more intense.

EXAMPLE 10

The reactions leading to the introduction of the aniline residues in Steps 1 and 4 of Example 9 lend themselves to considerable variation in the particular aniline derivative used in each. With essentially no other change in the procedure, the use of appropriate amounts of aniline in Step 1 and p-fluoroaniline in Step 4 results in the same monofluoro-quinolonoquinolone.

EXAMPLE 11

Steps 1 and 2

210 parts of diethyl oxalacetate-sodium salt is acidified in solution in benzene and the benzene solution washed free of excess acid as shown in Step 1 of Example 9. 112 parts of aniline is added in place of the p-fluoroaniline of Example 9 and the process of Step 1 continued to give an oily residue which is cyclized as shown in Step 2 of Example 9 to give 105 parts (48% yield) of 2-carbethoxy-4-quinolone, M.P. 204–208° C.

Step 3

108.5 parts of crude 2-carbethoxy-4-quinolone (0.5 mol) is dissolved with heat in a solution of 60 parts acetic anhydride in 290 parts of glacial acetic acid. After cooling to 45° C., 1.25 parts of iodine is added followed by 74.5 parts of sulfuryl chloride added dropwise while maintaining the temperature at 45° C. The mixture is then boiled under reflux for 1 hour, cooled slightly and diluted with 750 parts of water. After stirring for an hour, the solid is filtered, washed and dried to give 92.5 parts (73% yield) of 2-carbethoxy-3-chloro-4-quinolone, M.P. 213–216° C.

Step 4

231 parts (0.82 mol) of 2-carbethoxy-3-chloro-4-quinolone is added to 2000 parts p-chloroaniline in a suitable flask together with 169 parts potassium acetate and 4.0 parts of cupric acetatemonohydrate. The charge is heated at 145–150° C. for 5 hours with stirring, cooling to 100° C. and poured into 2700 parts 6 N HCl solution containing ice. The precipitated solid is filtered, washed with dilute acid and then with water and dried to give 189 parts (59% yield) of crude 2-(N-p-chlorophenyl)carboxamido-3-(p-chloroanilino)-4-quinolone. This product is added to 1450 parts of ethylene glycol together with 107 parts of potassium hydroxide and heated at 150° C. for 5 hours. The mixture is then poured into a large volume of ice water and acidified to pH 2.0 or below with 6 N HCl whereupon the precipitated solid is filtered, washed acid free and dried to give 188 parts of 2-carboxy-3-(p-chloroanilino)-4-quinolone.

Step 5

The above 188 parts of 2-carboxy-3-(p-chloroanilino)-4-quinolone is added to 1900 parts of polyphosphoric acid (84% $P_2O_5$) and heated for 4 hours at 150° C. It is cooled to 100° C. and added to a large volume of ice and water. This slurry is heated to the boil for a few minutes, filtered, washed acid free and dried. It is then extracted with dimethylformamide and recrystallized from sulfuric acid as described in Example 9 to give 37.6 parts of bright yellow 2-chloro-quinolonoquinolone.

Calculated for $C_{16}H_9N_2Cl$: percent C, 64.76; percent H, 3.06. Found: percent C, 64.36; percent H, 2.97.

When suitably reduced in particle size, the new pigment yields an attractive yellow coating composition which is greener and more intense than a similar composition from unsubstituted quinolonoquinolone.

When dihydroxyfumaric acid is esterified a large excess of alcohol is used. The alcohol shown in the above examples is methanol, and it is preferred for reasons of economy, but ethanol or the propyl alcohols or any aliphatic alcohol having 1 to about 3 carbon atoms can be used with equal facility in the esterification process. An acid catalyst is utilized in this step of the process and it is desirable to use as the acid catalyst an anhydrous non-oxidizing catalyst such as gaseous hydrochloric acid which serves the purpose admirably. It is pointed out that an unusual and novel feature in this step of the process resides in the utilization of anhydrous magnesium sulfate as a dehydrating agent to absorb the water formed during the reaction. The action of magnesium sulfate favors completion of the esterification reaction and results in a particularly high yield of ester. The amount of magnesium sulfate used in this step is not critical. Optimum results are obtained when there is adequate magnesium sulfate to absorb all of the water present. It is desirable to have a substantial excess of magnesium sulfate and an amount approximating the weight of the ester formed is adequate when anhydrous materials are used. However, an excess of magnesium sulfate is not harmful.

The condensation of an arylamine with dialkyl dihydroxyfumarate is an acid-catalyzed reaction which requires some solubility of the reactants and the catalyst in the reaction medium. The reaction medium may be selected from a wide range of organic liquids. When the condensation reaction is conducted in the inert liquid solvent methanol, as disclosed above in Example 1, it has the additional advantage that the acid catalyst, for example aniline hydrochloride, is readily soluble therein and the reaction will go to completion with good yields without the necessity of adding a large excess of arylamine. However, as shown in Example 2, the process may be carried out in an inert liquid solvent of the hydrocarbon type such as "Dowtherm A," a eutectic mixture of biphenyl and diphenyl oxide, in which case the solubility of the catalyst is promoted by adding excess aniline. Especially valuable in these cases are high boiling solvents which can be used in an integrated process which includes the subsequent cyclization reaction of the condensation product. This requires solvents that boil in the temperature range of from about 225° C. to 300° C. and includes besides "Dowtherm A," biphenyl, diethylphthalate and methyl naphthalenes, mineral oils in the preferred boiling range, tetramethylene sulfone, and mixtures thereof. When an excess of the arylamine e.g., 2 to 3 times the theoretical amount of aniline, is used with high boiling inert solvents to provide for the solubility of the catalyst, it is advisable to remove the major portion of the arylamine, for example, by distillation under vacuum before subsequent cyclization. As an alternative procedure, it is possible to use acid catalysts which are more soluble in these inert solvents or diluents in which case a large excess of aniline, or other arylamine, is unnecessary. The aromatic sulfonic acids are especially useful as catalysts in these cases with p-toluene sulfonic acid being a preferred species. Benzene sulfonic acid, xylene sulfonic acid and beta naphthalene sulfonic acid are typical representative members of this group of acid catalysts that have been found to be especially effective. Another suitable acid catalyst that has been found to be particularly effective in this process is trifluoroacetic acid.

The temperature of the condensation reaction of dialkyl dihydroxyfumarate with the arylamine can vary over a considerable range with the usual result being that higher temperatures require less time but tend to cause decomposition. When the condensation reaction is carried out in methanol, it is desirable to boil the methanol and to continue the reaction for from about 4 to 6 hours, preferably at least 5 hours. When "Dowtherm A" is used as the inert reaction medium it is preferred to operate in the temperature range of from 70° C. to 75° C. for a period of about 4 to 6 hours and to remove the water formed by operating under vacuum. In general, acceptable results are obtained when the temperature is maintained within the range of from about 60° C. to 100° C. However, the temperature range can be either increased or decreased during condensation and satisfactory results are obtained.

In view of the nature of the condensation reaction of the arylamine with dialkyl dihydroxyfumarate, the utilization of any arylamine in the process produces satisfactory results. Arylamines of the benzene series, such as substituted anilines, are especially useful in the process. Optimum results are obtained, especially in terms of the product produced using derivatives in which aniline is substituted with halogens such as chlorine, fluorine or bromine, with lower alkoxy or lower alkyl groups especially those containing 1 to 3 carbon atoms, and with nitro groups. However, it is also possible to use arylamines having a conjugated ring structure. The following arylamines are a representative list of compounds that illustrate those that have been found to be especially suitable in the invention: aniline, napthylamines, and substituted derivatives such as o-fluoroaniline, p-fluoroaniline, o-chloroaniline, p-chloroaniline, p-bromoaniline, o-toluidine, m-toluidine, p-toluidine, p-anisidine, p-phenetidine, 2,4-dichloroaniline, m-xylidine, o-chloro-p-toluidine.

The cyclization of dialkyl diarylaminofumarate to carboalkoxy-arylamino-quinolone requires a temperature in the range of from about 225° to 300° C., preferably about 250° C. to 260° C., in the presence of an inert liquid solvent that acts as a heat transfer agent. The preferred solvent is a eutectic mixture of biphenyl and diphenyl oxide which is commercially available and sold as the product, "Dowtherm A." However, other inert liquids having suitable boiling points of between about 225° to 300° C. may also be used, for example, those noted hereinabove as possible reaction media for the arylamine condensation reaction. The cyclization reaction is rapid and requires a short time, perhaps about 5 to 10 minutes at the desired temperature. A solution of the arylamino ester in the solvent may be heated to the reaction temperature and held for several minutes. However, as an alternative procedure which is sometimes preferred, a portion of the solvent containing the dialkyl diarylaminofumarate is heated to an intermediate temperature, for example, about 100° to 150° C. and then added slowly to a portion of the solvent maintained at the desired reaction temperature of 225° to 300° C., preferably about 250° C. This alternate procedure minimizes any possible decomposition of the arylamino ester and promotes improved yields. It is preferred to cyclize the ester as described above but it is also possible to hydrolyze to the free acid and then cyclize.

The method of separation of the resulting product of this step from the high boiling inert liquid solvent is not critical nor is complete removal of the solvent necessary. When this mixture is cooled to about 75° C. or below, preferably 30° C., the product is substantially insoluble in the inert liquid solvent and may be isolated by filtering, washing out the residual solvent with a low boiling non-polar solvent, such as petroleum ether, and finally drying the product. However, as pointed out above, complete removal of the solvent is not a requisite to the subsequent final cyclization step.

The final cyclization is an acidic dehydration step and may be done with a variety of dehydrating acids, for example, polyphosphoric acid, sulfuric acid and aromatic sulfonic acids such as p-toluidine sulfonic acid. Polyphosphoric acid with a $P_2O_5$ content of 82 to 84% is preferred. This is a commercial product or it can be made by reacting $P_2O_5$ in suitable proportions with the ordinary 85% commercially available phosphoric acid. The temperature at which final cyclization is conducted may vary over a wide range, for example, satisfactory results are obtained when the temperature is maintained between about 90° C. to about 175° C., preferably about 150° C. When the cyclization temperature is maintained at 150° C. the reaction time of about 2 hours gives substantially quantitative yields. Reaction times in the order of one hour give good yields and reaction times in the excess of two hours are not harmful except that some decomposition of the product may occur with prolonged heating in the presence of these powerful cyclodehydrating mineral acids. When lower temperatures are employed there is a slight increase in the required optimum time with a corresponding slight decrease at higher temperatures. Such lower temperatures, as low as about 90° C., are desirable in the case of the methoxy derivatives to avoid decomposition even though a longer time up to as much as 6 hours may be needed.

As shown in Example 3, integration of cyclization steps, it is possible and often preferable to add the acidic cyclizing acid directly to the mixture in the inert liquid solvent used in the cyclizing step whereupon the acid dissolves the intermediate out of the inert liquid while simultaneously bringing about the final cyclization. A two-layer system is then formed from which the inert liquid may be decanted prior to the regeneration of the final pigment from its solution in the acid.

This final regeneration step may be done in various manners which may be used to control the properties of the final pigment. A simple regeneration by the rapid addition of the acid solution to an ice-water mixture results in a quantitative yield of the relatively pure pigment which may be isolated by conventional procedure.

An alternative method of regeneration of the pigment that is of special value when the cyclizing agent used is polyphosphoric acid can be referred to as "Solvolysis," wherein a lower aliphatic alcohol such as methanol or ethanol is added to the warm polyphosphoric acid mixture and subjected to prolonged boiling under reflux. The alcohol reacts relatively slowly with the acid salt to regenerate the pigment in very small particle size of acceptable pigment quality. In carrying out this method an excess of alcohol should be present and boiling of the mixture should be continued until the pigment is completely regenerated.

As pointed out above, the oxalacetate method is another useful route particularly for the preparation of monohalogen and monoalkoxy derivatives of quinolonoquinolone and to other unsymmetrical compounds. For a most successful operation, there are certain precautions that should be observed in the various process steps. For example, the condensation of the arylamine with oxalacetic acid is a straightforward reaction but it is preferably carried out in the presence of an excess amount of arylamine. At the conclusion of the reaction the excess arylamine should be removed before the cyclization step. This is conveniently done by washing the condensation reaction mixture with dilute aqueous mineral acid, such as hydrochloric acid. An alternative, and often preferable procedure, is to carry out the arylamine condensation reaction in an inert liquid solvent such as "Dowtherm A" or similar high boiling liquids from which the unreacted arylamine can be distilled and the cyclization can then take place in the solvent without isolating the anilino derivative.

Any arylamine can be used in either condensation step in the process. Those described above in the alternate process in relation to the condensation reaction of an arylamine with a dihydroxyfumarate ester are suitable. Here, too, arylamines of the benzene series such as substituted anilines are especially effective. Furthermore, the same or a different arylamine may be used in each of the condensation steps in this process.

The first cyclization step is done under the influence of heat, and a high boiling liquid solvent, preferably "Dowtherm A," which is a satisfactory inert liquid for use in the process. Other inert liquids boiling above about 225° C. or 240° C. can also be used. Representative examples of other suitable liquid solvents that can be used include the methyl naphthalenes, biphenyl, diphenyl oxide, diethyl phthalate, tetramethylene sulfone and the mineral oils boiling above about 225° C. and like materials as well as mixtures thereof. Isolation of the compound from the liquid inert solvent is conveniently done by filtration, suitable washing and drying.

The chlorination step in this process can be conducted with sulfuryl chloride or other suitable chlorinating agents wherein a chlorine atom is substituted on the quinolone residue for hydrogen.

The subsequent condensation reaction of the carbalkoxy chloroquinolone with an arylamine, preferably of the benzene series, such as, for example fluoro-aniline, is conveniently done with a very large excess of the arylamine which serves as the reaction medium as well as the reactant. The arylamines disclosed above are suitable for use in this process. The excess arylamine is removed after the condensation reaction, and this can conveniently be done by dissolving the condensation reaction mixture in dilute mineral acid such as hydrochloric acid; or the major part of the unreacted arylamine may be removed by filtration and the balance removed by solution in dilute hydrochloric acid or by steam distillation. In this reaction, not only does the arylamine replace the chlorine atom on the quinolone residue, but a second molecule of the arylamine condenses with the ester group to form an N-phenyl carboxamido group, which is removed during the subsequent cyclization or prior thereto. The N-phenyl carboxamido group does not interfere with the cyclization, as shown in Example 9 above, but it is convenient to remove it prior to cyclization. This may readily be done by heating it with an alkali such as potassium hydroxide in a water miscible solvent such as ethylene glycol followed by acidification to precipitate the desired product and dissolve the separated arylamine.

The final cyclization step requires more strenuous conditions than the first cyclization step and it is conveniently done under the influence of a strong dehydrating acid of which polyphosphoric acid is the agent of choice. The temperature of the cyclization reaction is preferably in the range of 90° C. to about 160° C. At lower temperatures the rate of cyclization is reduced and at significantly higher temperatures some decomposition of the product occurs.

Regeneration of the pigment from the solution in polyphosphoric acid is usually done by dilution with water but it may also be done with other agents which will react with the acid. Such agents include the alcohols, such as methanol.

Although the products resulting from these processes are useful yellow pigments, their utility is enhanced if they are purified and reduced in particle size. Purification may be done in various ways but it is conveniently accomplished in two steps, the first being an extraction of the pigment with a hot solvent such as dimethylformamide. The choice of solvent is not critical but the degree of removal of impurities is related to the solvency power and it is preferred to use powerful solvents which may also include dimethylacetamide, dimethyl sulfoxide, tetramethylene sulfone and the like. The manner of carrying out the extraction is conventional and well known in the art.

The second step of purification involves forming a solution of the pigment in a strong acid such as 98% sulfuric acid and regeneration therefrom. The regeneration may be a rapid dilution with water which also results in particle size reduction, but is less effective as a purification step. It is preferred to dilute cautiously to about 90–91% sulfuric acid whereupon the sulfate of the quinolonequinolone is precipitated. Filtration at this point removes impurities that are still in solution and further treatment of the crystalline solid with water will then regenerate the pigment.

Methods of particle size reduction are well known in pigment technology. A convenient method comprises milling in a ball mill with about 10 parts of common salt per part of pigment, after which the salt is extracted by solution in hot dilute mineral acid leaving the pigment in a suitable small particle size. Other useful methods include ball milling with organic solvents, milling in water under conditions of high rates of shear in the presence of a crystalline water soluble salt, such as borax and the like.

There are many advantages using the hydroxyfumaric acid process disclosed herein over the processes known heretofore for making quinolonoquinolone. The overall yield of the pigment using the preferred process is substantially improved over that obtainable by other processes. Furthermore, the preferred process uses readily accessible raw materials which makes the operation economically feasible. In addition, the products produced by this invention do not necessarily require purification steps or particle size reduction for pigmentary utility. The new halogenated quinolonoquinolones show a broad selection of variations in hue from the parent compound and they also show increased intensity of color and, in some cases, marked improvements in strength while retaining the good lightfastness and excellent properties of the parent quinolonoquinolone. The dimethoxy derivative of this invention has the advantage of being very reddish-yellow in hue while retaining the other valuable properties of the parent compound. Dimethoxyquinolonoquinolone is particularly outstanding as a reddish shade yellow pigment of excellent lightfastness which exhibits remarkable strength and is non-bleeding in solvents and most chemical reagents with which pigments commonly come in contact.

The products of this invention are useful as pigments in coating compositions and in coloring plastics, rubber, paper, linoleum and the like, and are incorporated into these substances by procedures well known in the pigment art.

We claim:
1. A method for producing quinolonoquinolone and derivatives thereof in substantially pure state, comprising condensing a dialkyl dihydroxyfumarate having 1 to about 3 carbon atoms in the alkyl group with an arylamine in an inert liquid organic solvent and in the presence of an acid catalyst to form a dialkyl diarylaminofumarate condensation product, employing in the condensation at least 2 moles of arylamine per mole of dialkyl dihydroxyfumarate, cyclizing the condensed product obtained to a carboxyarylaminoquinolone through heat treatment to a temperature ranging from 225–300° C. in an inert liquid organic solvent boiling above 225° C., further cyclizing said product to a quinolonoquinolone by heat treatment to temperatures ranging from 90–175° C. in the presence of an acidic water absorbing dehydrating agent, and thereafter recovering the desired quinolonoquinolone product.

2. The process of claim 1 in which the inert liquid organic solvent employed in the cyclization is a eutectic mixture of biphenyl and diphenyl oxide.

3. The process of claim 1 in which the arylamine is aniline.

4. The process of claim 1 in which the arylamine is a substituted aniline.

5. The process of claim 1 in which the acidic water absorbing dehydrating agent is polyphosphoric acid.

6. The process of claim 1 in which the dialkyl dihydroxyfumarate ester employed in the condensation is formed by reacting dihydroxyfumaric acid with a lower aliphatic alcohol containing from 1 to 3 carbon atoms in the presence of magnesium sulfate and the condensation is effected with an arylamine of the benzene series.

7. The process of claim 6 in which polyphosphoric acid is employed as the dehydrating agent.

8. The process of claim 6 in which the arylamine is aniline, the acid catalyst employed in the condensation is aniline hydrochloride, and the further cyclization is carried out at 90–150° C. in the presence of polyphosphoric acid.

9. The process of claim 6 in which the arylamine is a lower alkoxy substituted aniline.

10. The process of claim 9 in which the substituted aniline is methoxyaniline.

11. A quinolonoquinolone pigment selected from the group consisting of:

(a)
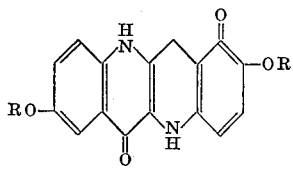

wherein R is an alkyl selected from the group consisting of methyl and ethyl; and (b)
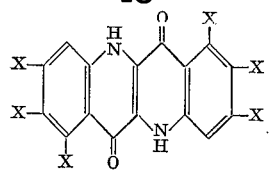

wherein X is a substituent selected from the group consisting of F, Cl, Br and H, with at least one and not more than two of the halogen atoms of said substituent being substituted on each of the terminal rings.

12. 2,8-difluoroquinolonoquinolone.
13. 2,8-dibromoquinolonoquinolone.
14. 2,3,8,9-tetrachloroquinolonoquinolone.
15. 2,8-dichloroquinolonoquinolone.
16. 2,8-dimethoxyquinolonoquinolone.

References Cited
UNITED STATES PATENTS

| | | | |
|---|---|---|---|
| 3,024,268 | 3/1962 | Struve | 260—279 X |
| 3,156,719 | 10/1964 | Griswold et al. | 260—279 X |
| 3,201,122 | 8/1965 | Streiff | 260—279 |
| 3,257,405 | 6/1966 | Gerson et al. | 260—279 |

ALEX MAZEL, *Primary Examiner.*

DONALD G. DAUS, *Assistant Examiner.*